N. R. M. WEIBULL.
DIVIDED PULLEY.
APPLICATION FILED AUG. 25, 1920.

1,417,960.

Patented May 30, 1922.

INVENTOR:
Nils R. M. Weibull
By Wm Wallace White ATTY.

UNITED STATES PATENT OFFICE.

NILS RUDOLF MARTIN WEIBULL, OF BOFORS, SWEDEN.

DIVIDED PULLEY.

1,417,960.

Specification of Letters Patent. Patented May 30, 1922.

Application filed August 25, 1920. Serial No. 405,962.

*To all whom it may concern:*

Be it known that I, NILS RUDOLF MARTIN WEIBULL, a subject of the King of Sweden, residing at Bofors, Sweden, have invented new and useful Improvements in Divided Pulleys, of which the following is a specification.

This invention relates to improvements in split pulleys, the object of the invention being to provide a pulley having interchangeable bushings for different size shafts, and by means of which the bushing is securely held upon the shaft and the pulley also firmly held in position by means of a single key or the like.

In the ordinary pulleys composed of two halves, loose bushings of varying thickness are often used for permitting the use of pulleys of a certain diameter of their central openings upon shafts of different diameters. In these pulleys, however, it is necessary to prevent the turning of the pulley upon the bushing as well as the bushing upon the shaft. In such cases where this cannot be accomplished by means of a simple clamping, the connection has been made by keys introduced between the shaft and the bushing and also between the bushing and the hub of the pulley.

The present invention relates to an arrangement by which the bushing is securely held upon the shaft and the pulley also firmly held in position by means of a single key or the like, and the invention is characterized thereby that one half of the hub of the pulley is provided with a larger central opening than the other half, the bushing being divided in two halves corresponding to the different diameters of opening in the halves of the hubs, and that one of these two halves of the bushing is fastened to the shaft by means of a key or the like.

In the drawings accompanying and forming part of this application,

In these drawings, 1 and 2 designate the two halves of the pulley, the hub of one of these halves being provided with a bore having a larger radius than that of the opening in the other hub half. 3 and 4 are the two halves of the bushing, of which halves 3 possesses a thickness less than that of the other half 4 for fitting around the shaft 5. At the point where the two halves of the bushing meet upon the shaft when the pulley is placed on the bushing, there are formed the shoulders 6.

Figure 1:
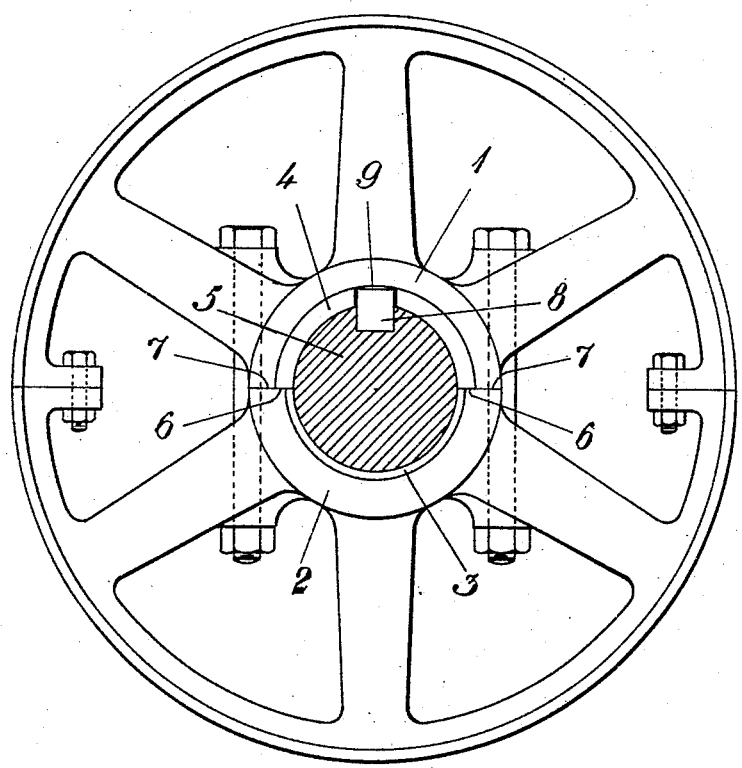
Figure 1 is a side elevation of the improved pulley.
Figure 2:
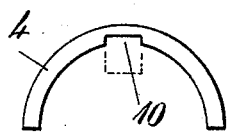
Figure 2 is a side elevation of the bushing having the keyway therein.

The bushing and the hub for this reason cannot perform any turning movement in relation to one another and their turning on the shaft is prevented by means of the key 8 provided in one half of the bushing. This key may be placed either in a slot 9 running through the wall of the bushing or in a groove 10 as shown in Fig. 2.

Having now particularly described the nature of my invention and the manner of its operation, what I claim is:

1. In a split pulley, two halves having shaft openings of different radii, a two-part bushing enclosed by said pulley halves having the interior radii uniform and the external diameters corresponding to the radii of the pulley halves, the halves of the bushing being of different thickness, and a key provided in one part of said bushing in engagement with the pulley shaft.

2. A split pulley having the halves bored to different radii, and interchangeable bushings therefor comprising halves with external radii corresponding respectively with the internal radii of the pulley, and internal radii corresponding to that of the shaft to which the pulley is to be applied.

3. A split pulley having the halves bored to different radii, and interchangeable bushings therefor comprising halves with external radii corresponding respectively with the internal radii of the pulley, and internal radii corresponding to that of the shaft to which the pulley is to be applied, one of said bushings having a keyway to enable it to be keyed to the shaft.

4. A split pulley having the halves bored to different radii, and interchangeable bushings therefor comprising halves with external radii corresponding respectively with the internal radii of the pulley, and internal radii corresponding to that of the shaft to which the pulley is to be applied, the thicker of said bushings having a keyway to enable it to be keyed to the shaft.

In testimony whereof I have signed my name to this specification.

NILS RUDOLF MARTIN WEIBULL.